US010255705B2

(12) United States Patent
McCullough

(10) Patent No.: US 10,255,705 B2
(45) Date of Patent: Apr. 9, 2019

(54) APPARATUS AND METHOD FOR DISPLAYING INFORMATION

(71) Applicant: Jaguar Land Rover Limited, Coventry, Warwickshire (GB)

(72) Inventor: Francis McCullough, Coventry (GB)

(73) Assignee: Jaguar Land Rover Limited, Coventry, Warwickshire (GB)

( * ) Notice: Subject to any disclaimer, the term of this patent is extended or adjusted under 35 U.S.C. 154(b) by 0 days.

(21) Appl. No.: 15/544,395

(22) PCT Filed: Feb. 19, 2016

(86) PCT No.: PCT/EP2016/053536
§ 371 (c)(1),
(2) Date: Jul. 18, 2017

(87) PCT Pub. No.: WO2016/135056
PCT Pub. Date: Sep. 1, 2016

(65) Prior Publication Data

US 2018/0040151 A1 Feb. 8, 2018

(30) Foreign Application Priority Data

Feb. 23, 2015 (GB) .................................. 1502977.0

(51) Int. Cl.
*G06T 11/60* (2006.01)
*B60R 1/00* (2006.01)
(Continued)

(52) U.S. Cl.
CPC ................ *G06T 11/60* (2013.01); *B60R 1/00* (2013.01); *G02B 27/0172* (2013.01);
(Continued)

(58) Field of Classification Search
CPC ........ B60R 2300/205; B60R 2300/308; G06T 11/60
See application file for complete search history.

(56) References Cited

U.S. PATENT DOCUMENTS

2013/0235351 A1 9/2013 Sachdev et al.
2014/0351279 A1* 11/2014 Hoshina .............. G06F 11/0739
707/758

(Continued)

FOREIGN PATENT DOCUMENTS

EP 2456203 A1 5/2012
GB 2516279 A 1/2015
JP 2008265720 A 11/2005

OTHER PUBLICATIONS

"The Transparent Bonnet", http://www.landrover.com/experiences/news/the-transparent-bonnet.html (2014) 1 page.
(Continued)

*Primary Examiner* — Ryan R Yang
(74) *Attorney, Agent, or Firm* — Myers Bigel, P.A.

(57) ABSTRACT

Embodiments of the present invention provide a display method for use in a vehicle, comprising obtaining information associated with a vehicle or external image data of a region proximal to the vehicle, and displaying, on a display device worn by an occupant of the vehicle, one or more of a graphical representation of at least one component of the vehicle having one or more characteristics based on the information associated with the vehicle, or a representation of the external image data, wherein the one or more displayed representation is arranged to overlie a portion of the vehicle to be indicative of a portion of the vehicle being at least partly transparent.

20 Claims, 7 Drawing Sheets

(51) Int. Cl.
*G02B 27/01* (2006.01)
*H04N 5/232* (2006.01)
*H04N 5/247* (2006.01)
*G06F 3/01* (2006.01)

(52) U.S. Cl.
CPC ..... *G02B 27/0179* (2013.01); *H04N 5/23293* (2013.01); *H04N 5/247* (2013.01); *B60R 2300/105* (2013.01); *B60R 2300/202* (2013.01); *B60R 2300/205* (2013.01); *B60R 2300/303* (2013.01); *B60R 2300/802* (2013.01); *G02B 2027/014* (2013.01); *G02B 2027/0138* (2013.01); *G02B 2027/0141* (2013.01); *G02B 2027/0181* (2013.01); *G02B 2027/0187* (2013.01); *G06F 3/013* (2013.01)

(56) References Cited

U.S. PATENT DOCUMENTS

| | | |
|---|---|---|
| 2015/0002640 A1 | 1/2015 | Reicher et al. |
| 2015/0009100 A1 | 1/2015 | Haneda et al. |
| 2015/0232030 A1* | 8/2015 | Bongwald ............... B60R 1/00 348/115 |
| 2015/0294505 A1* | 10/2015 | Atsmon ............... G06T 19/006 345/633 |

OTHER PUBLICATIONS

"Land Rover Debuts Invisible Car Technology", http://newsroom.jaguarlandrover.com/en-gb/land-rover/news/2014/04/lr_dvc_tease_technology_090414 (2014) 2 pages.

Combined Search and Examination Report, GB Application No. 1502977.0, dated Jul. 30, 2015, 9 pages.

Notification of Transmittal of the International Search Report and the Written Opinion of the International Searching Authority, or the Declaration, PCT/EP2016/053536, Apr. 28, 2016.

* cited by examiner

APPARATUS AND METHOD FOR DISPLAYING INFORMATION

RELATED APPLICATIONS

This application is a 35 U.S.C. § 371 national stage application of PCT Application No. PCT/EP2016/053536, filed on Feb. 19, 2016, which claims priority from Great Britain Patent Application No. 1502977.0 filed, on Feb. 23, 2015, the contents of which are incorporated herein by reference in their entireties. The above-reference d PCT International Application was published in the English language as International Publication No. WO 2016/135056 A1 on Sep. 1, 2016.

TECHNICAL FIELD

The present disclosure relates to a display method for use in a vehicle and a display apparatus for use in a vehicle.

BACKGROUND

It is important for a driver of a vehicle to be provided with information to drive the vehicle safely and accurately. Information provided to the driver includes a view from the vehicle and also information concerning the vehicle such as a speed of the vehicle. In some vehicles, such as sports utility vehicles (SUVs) or 4 wheel drive vehicles, the view from an interior of the vehicle may be partially obscured by a bonnet or hood of the vehicle, interior feature of the vehicle, such as seats, or the fact that the vehicle may be relatively long thus preventing an occupant having good rearward vision, for example. These problems may be particularly notable when the vehicle is on an incline or at a top of a descent, when crossing complex terrain such as when driving off-road, or simply manoeuvring in a confined space such as a car park It is an object of embodiments of the invention to aid a driver of a vehicle. It is an object of embodiments of the invention to improve a driver's from a vehicle and/or to provide information associated with the vehicle in a convenient manner. It is an object of embodiments of the invention to at least mitigate one or more of the problems of the prior art.

SUMMARY OF THE INVENTION

According to an aspect of the present invention, there is provided a display method for use in a vehicle. The method may comprise obtaining information associated with a vehicle or external image data. The method may comprise displaying, on a display device worn by an occupant of the vehicle, one or more of a graphical representation having one or more characteristics based on the information associated with the vehicle, or a representation of the external image data. Advantageously the displayed graphical representation or image data may be viewable by a user regardless of viewing direction.

According to an aspect of the present invention, there is provided a display method for use in a vehicle, comprising obtaining information associated with a vehicle or external image data of a region proximal to the vehicle. The method may comprise displaying, on a display device worn by an occupant of the vehicle, one or more of a graphical representation of at least one component of the vehicle having one or more characteristics based on the information associated with the vehicle, or a representation of the external image data. The one or more displayed representation may be arranged to overlie a portion of the vehicle to be indicative of a portion of the vehicle being at least partly transparent. Advantageously the displayed graphical representation or image data may be viewable by a user regardless of viewing direction.

The method may comprise determining a viewing direction of an occupant of the vehicle, wherein the graphical representation of the at least one component of the vehicle or the representation of the external image data is generated based on the viewing direction. Advantageously the displayed graphical representation or image data is adapted based on viewing direction.

The method may comprise receiving occupant image data from an imaging device associated with the display device, wherein the occupant image data generally corresponds to the viewing direction of the occupant. Advantageously the viewing direction is determined according to the image data.

The method may comprise determining the viewing direction of the occupant of the vehicle based on a registration feature present in the occupant image data.

The method may comprise receiving sensor data from one or more sensors associated with the display device, and determining the viewing direction based thereon. Advantageously the viewing direction is determined based on movement associated with the display device.

The representation may be translucently displayed. The representation may be arranged to overlie an external portion of the vehicle. The external portion may be a bonnet of the vehicle. The representation may be arranged to overlie an interior portion of the vehicle. The representation may be perceived along with the portion of the vehicle.

The interior portion of the vehicle may comprise one or more of a dashboard of the vehicle, a door of the vehicle a floor of the vehicle or interior features of the vehicle.

The information associated with the vehicle may be information associated with the at least one component of the vehicle. The at least one component of the vehicle is a mechanical component of the vehicle. Optionally the mechanical component is one of a steering system of the vehicle, one or more wheels of the vehicle, a suspension of the vehicle or an engine of the vehicle. Advantageously information associated with the components is provided to the user. The components may be relevant to driving the vehicle, particularly off-road.

The information associated with the vehicle may be obtained from a communication bus of the vehicle.

The external image data may be obtained from one or more cameras associated with the vehicle. The cameras may be arranged to view at least a portion of a region around the vehicle. The one or more cameras may be arranged to view in a generally downward direction. The external image data may allow a user to perceive otherwise obscured features near the vehicle.

The method may comprise processing the external image data such that the representation of the external image data corresponds to a viewing direction of the occupant.

The method may comprise processing the external image data to introduce a delay into at least a portion of the external image data. Advantageously the delay allows for movement of the vehicle.

The method may comprise determining the delay based on information associated with the vehicle, optionally wherein the information is indicative of a speed of the vehicle. Advantageously the delay allows the display to correspond to a position of the moving vehicle.

According to another aspect of the invention there is provided a display apparatus for use with a vehicle, comprising a wearable display means arranged for displaying information to an occupant of the vehicle such that the displayed information overlies a portion of the vehicle, and a processing means arranged to determine information associated with the vehicle or to receive external image data for a region ahead of the vehicle and to cause the display means to display one or more of a graphical representation of at least one component of the vehicle having one or more characteristics based on the information associated with the vehicle, or a representation of the external image data.

The display means may be arranged to translucently display information thereon.

The display means may be arranged to translucently display the representation so the portion of the vehicle is partly visible.

The representation may be displayed to overlie the portion of the vehicle from a point of view of the occupant.

The display means may comprise an imaging device for outputting external image data corresponding to a viewing direction of the occupant.

The processing means may be arranged to determining a viewing direction of an occupant of the vehicle based on the occupant image data.

The processing means may be arranged to determining the viewing direction vehicle based occupant image data of a registration feature.

The information associated with the vehicle may be information associated with the at least one component of the vehicle.

The at least one component of the vehicle may comprise a steering system of the vehicle, one or more wheels of the vehicle, a suspension of the vehicle or an engine of the vehicle.

The apparatus may comprise one or more cameras arranged to output the external image data.

The one or more of the cameras may be arranged to view at least a portion of a region around the vehicle.

Optionally at least some of the one or more cameras are arranged to view in a downward direction.

The processing means may be arranged to receive occupant image data of the occupant and to determine the viewing direction of the occupant based thereon.

The processing means may be arranged to process the external image data to introduce a delay into the representation of the external image data.

According to a yet further aspect of the invention there is provided a vehicle comprising the apparatus of an aspect of the invention or arranged to perform a method according to an aspect of the invention.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

Embodiments of the invention will now be described, by way of example only, with reference to the accompanying figures, in which.

DETAILED DESCRIPTION

Figure 1:
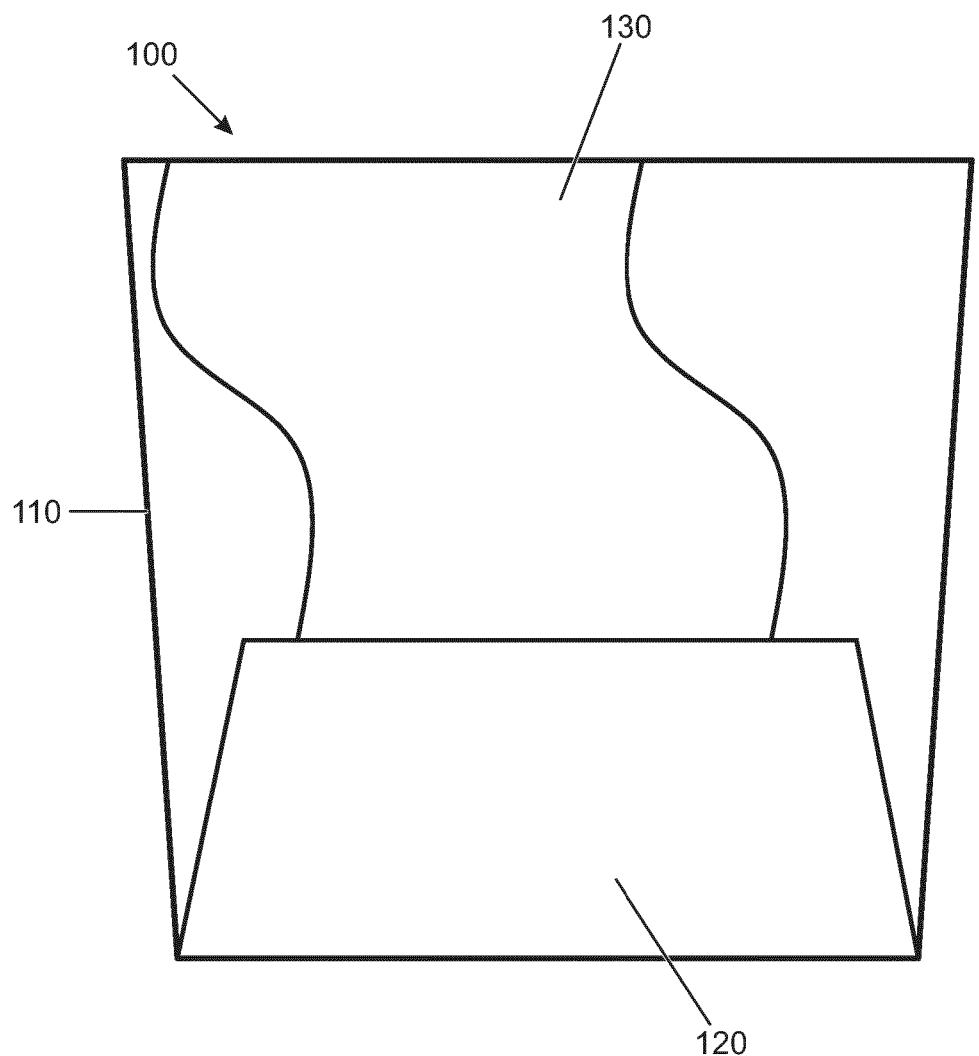
FIG. 1 shows an illustration of a typical view from a conventional vehicle.

FIG. 1 illustrates a typical view 100 from a conventional vehicle. The view is from an interior of the vehicle through a windscreen or windshield 110 of the vehicle viewing forwards. A portion of a bonnet or hood 120 of the vehicle is visible extending forward from beneath the windscreen 110. The vehicle is travelling along a roadway 130 which is visible from the vehicle. As can be appreciated, the bonnet 120 obscures the view of the roadway 130 close the vehicle. This problem is exacerbated when the vehicle is inclined with respect to the roadway 130 ahead of the vehicle i.e. when an angle between the vehicle and the roadway ahead is increased, such as when the vehicle is at a top of a descent (not yet descending a slope) or is inclined upward on a small undulation. In these situations the roadway 130 may have reduced visibility from the vehicle particularly due to being obscured by the bonnet 120.

Similarly, a view from the vehicle is also obscured by other portions of the vehicle, such as doors of the vehicle which obscure a view of an area adjacent to the vehicle, the vehicle itself obscures a view of an area underneath or behind the vehicle, particular regions close to the vehicle. Thus it can be appreciated that for an occupant of the vehicle it is often difficult to view an area proximal to the vehicle, such as ahead, at a side, rear of the vehicle or underneath the vehicle.

Figure 2:
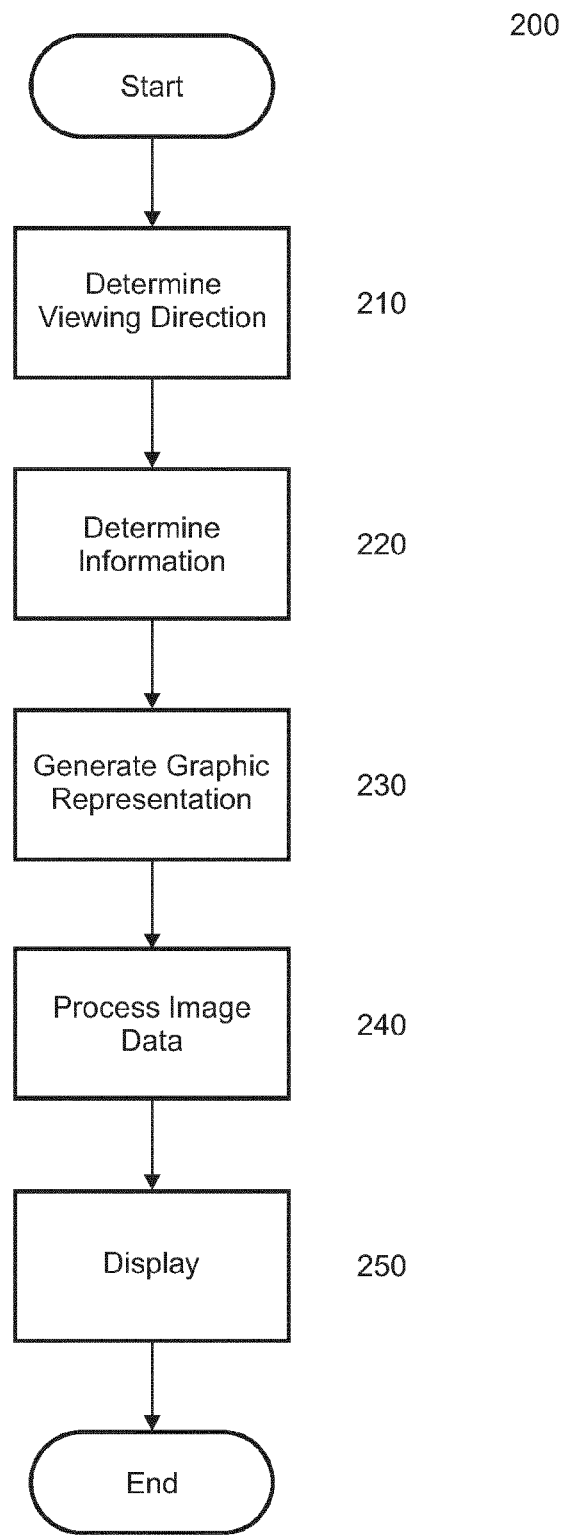
FIG. 2 shows a method according to an embodiment of the invention.

FIG. 2 illustrates a method 200 according to an embodiment of the invention which will be explained with reference to FIGS. 3-6 in particular. The method 200 is a display method for use in a vehicle. The vehicle may be a land-going vehicle, such as a wheeled vehicle.

Figure 3:
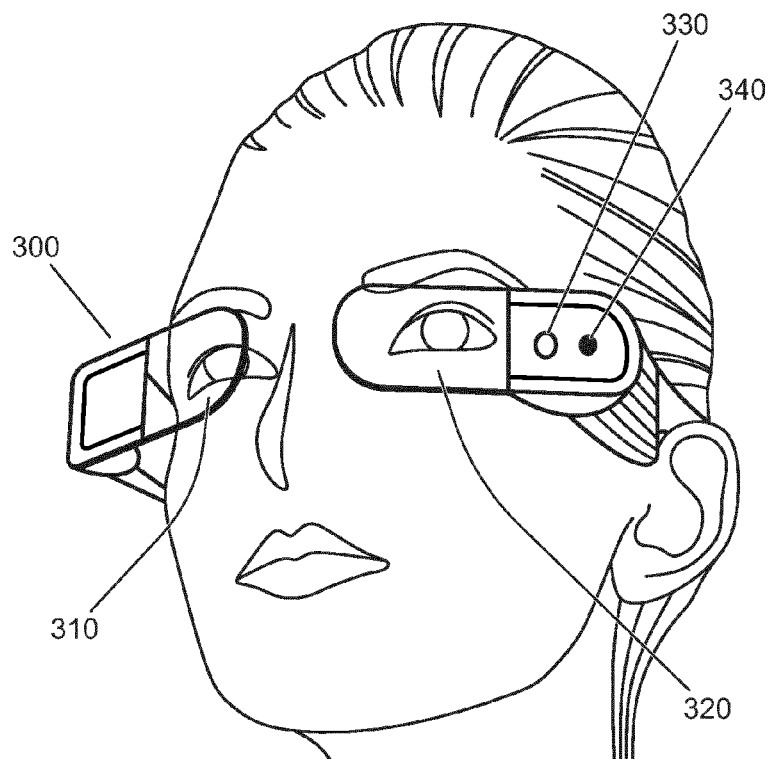
FIG. 3 illustrates a display means according to an embodiment of the invention.

FIG. 3 illustrates a display means 300 worn by a user on which a graphical representation of at least one component of the vehicle or a representation of external image data associated with the vehicle is displayed to overlie a portion of the vehicle.

The display means 300 shown in FIG. 3 is headgear arranged to display images to the wearer. The headgear 300 may be known as augmented reality glasses. The headgear 300 comprises at least one imaging device arranged to operably display an image to the wearer. As shown in FIG. 3, the headgear 300 comprises at least one of a first optical combiner 310 and a second optical combiner 320 each arranged to display an image in front of the wearer's right and left eyes, respectively. The displayed images are partly transparent or translucent so that the wearer may still perceive detail of the environment behind the displayed image. Images displayed on the combiners 310, 320 may be generated by a respective projector housed in each side of the headgear 300.

The headgear 300 further comprises at least one imaging means or device 330 for outputting occupant image data from a camera 330. The camera 330 is arranged to output occupant image data from which a direction of view of the wearer can be determined. In use the wearer is an occupant of the vehicle and therefore the occupant image data output by the camera 330 corresponds at least partly to an interior of the vehicle. From the occupant image data one or more registration features within the vehicle are identified from which the direction of view of the wearer is determined. The registration features are features of the vehicle having a known geometry such that a processing device receiving the occupant image data is able to determine the wearer's direction of view based on the imaged geometry. For example, a registration feature may be a design located on an interior surface of the vehicle or may be a feature such as a portion of the vehicle's interior, for example a handle, lever or opening feature such as a glove box lid. Given the known geometry of the registration feature the direction of view of the wearer may be determined by the processing device in receipt of the occupant image data.

For some viewing directions it may not be possible to determine the viewing direction based on the occupant image data, such as when the occupant image data does not correspond to a registration feature or the view of the registration feature is obscured, for example. Therefore the headgear 300 may comprise one or more sensing means, or sensors 340 from an output of which the viewing direction may be determined. The viewing direction may be determined based upon a previously known viewing direction (such as based on a registration feature in the occupant image data) and the output of the one or more sensors 340. The viewing direction is determined based upon the previously known viewing direction in a dead reckoning manner. The sensors 340 may comprise an accelerometer and/or an inertial sensor. The output of the sensor(s) 340 is provided to the processing device which is arranged to determine a change in viewing direction from a previous viewing direction based on data received from the sensors, such as indicative of acceleration caused by movement of the wearer's head.

Figure 4:
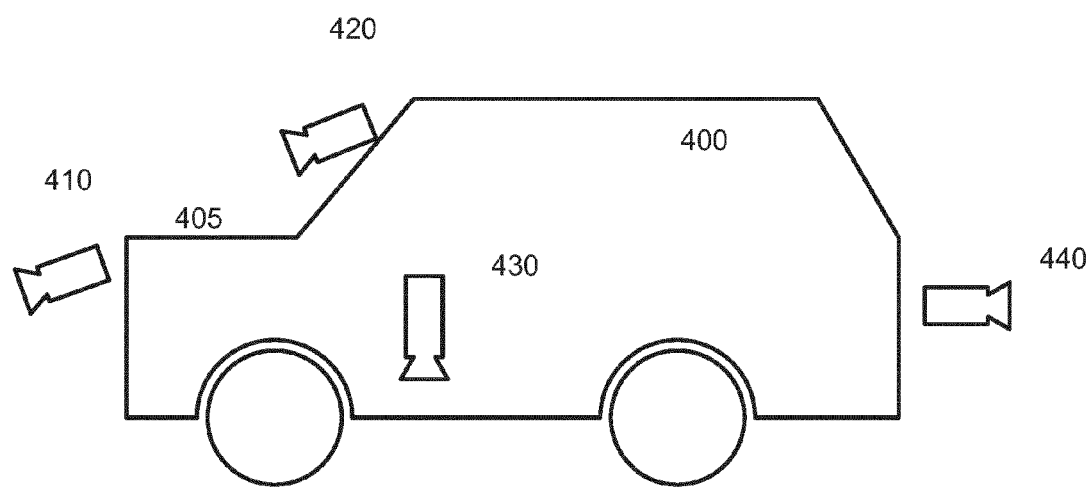
FIG. 4 shows an illustration of a vehicle according to an embodiment of the invention.

FIG. 4 illustrates a vehicle 400 according to an embodiment of the invention. The vehicle 400 comprises one or more cameras 410, 420, 430, 440. The cameras 410, 420, 430, 440 are arranged to output external image data each corresponding to a region proximal to the vehicle 400. The region proximal to the vehicle may be ahead, behind, adjacent to (at a side of) or underneath the vehicle. It will be realised that cameras 410, 420, 430, 440 may be placed elsewhere about the vehicle. Therefore the region may be anywhere around or underneath the vehicle 400. The locations of the cameras 410, 420 in FIG. 4 are merely illustrative.

A camera 410 may be located at a front of the vehicle 400 lower than a plane of a bonnet 405 of the vehicle 400, as described above. A camera 420 may be located at a location above the plane of the bonnet 405 such as at a location generally at an upper region of the vehicle's windscreen. As noted above, the one or more cameras may be arranged to view generally downward in order to output external image data for a portion of ground ahead of the vehicle's current location.

It will also be appreciated that one or more cameras may be arranged to view in a direction other than ahead of the vehicle 400. For example one or more cameras may be arranged to view at one or both sides of the vehicle 400, or to a rear of the vehicle. As will be explained, the occupant of the vehicle may turn their direction of view to a side or rear of the vehicle such that the display means 300 displays external image data provided from one or more of the cameras 410, 420, 430, 440 corresponding to the direction of view. For example the occupant may turn to view toward a rear of the vehicle and external image data based upon a rear-viewing camera may be provided to the occupant, for example to enable a view at an obscured rear area of the vehicle to be observed. Therefore a camera 430 may be arranged at a rear of the vehicle to view generally behind the vehicle, such as for the purpose of aiding reversing the vehicle 400. Similarly one or more cameras may be arranged at sides of the vehicle, for example housed in a wing-mirror of the vehicle to view a region proximal to the side of the vehicle 400.

Returning to FIG. 2, the method 200 comprises a step 210 of determining a viewing direction of a vehicle occupant. Step 210 may comprise receiving occupant image data corresponding to one or more registration features of a vehicle, such as within an interior compartment of the vehicle 400. The occupant image data may be provided from the one or more cameras 330. The viewing direction is determined based upon the occupant image data of registration features and/or measured movement of a wearer of a display device 300 such as by one or more motion sensing means 340. The motion sensing means may be the one or more sensors 340 of the headgear 300. If at least one registration feature is visible in the occupant image data, then a viewing direction is determined based upon an orientation of the registration feature, such as an angle of the registration feature in the occupant image data. If, however, no registration features are visible in the occupant image data then the viewing direction is determined based upon sensor data output by the one or more sensors 340 associated with the display device 300. The sensor data may be indicative of an orientation of the display device 300 or acceleration of the display device by the wearer's movement. Based upon a previously known viewing direction from the occupant image data a current viewing direction may be determined.

In another embodiment, the viewing direction of the vehicle occupant is determined based on occupant image data of, or corresponding to, the vehicle occupant. A processing device may be arranged to receive occupant image data corresponding to a view of the vehicle occupant and to determine their viewing direction based thereon, such as based on the occupant's eye or head position.

The method 200 comprises a step 220 of obtaining information associated with the vehicle, or external image data for a region proximal to, or around, the vehicle 400. The external image data may be for a region near to the vehicle, such as up to 100 m from the vehicle. The information or external image data may be obtained by a processing means, such as a processing device, of an embodiment of the invention.

The information associated with the vehicle 400 may be information associated with the at least one component of the vehicle, such as one or more mechanical components of the vehicle 400. The component of the vehicle may be one of a steering system of the vehicle, one or more wheels of the vehicle, a suspension of the vehicle or an engine or motor of the vehicle. It will be realised that other components of the vehicle may also be envisaged.

In the described example the information is associated with the wheels of the vehicle and, in particular, a steering angle of the wheels, although it will be realised that this is merely an example. The information may be obtained by the processing device from one or more steering angle sensors. The information may be obtained by the processing device receiving information from a communication bus of the vehicle, such as a CAN bus, although the communication bus may be based on other protocols such as Ethernet. The information associated with the vehicle, or the external image data, may be obtained based upon the viewing direction determined in step 210. The information associated with the vehicle may be obtained only for one or more components within a range of the viewing direction of the occupant. For example if the occupant is viewing an area corresponding to a front wheel of the vehicle, the information associated with the vehicle may comprise information related to the steering angle of the vehicle, whereas if the viewing direction is toward a rear of the vehicle, information indicative of the steering angle may not be obtained as not being relevant to the viewing direction. Similarly only external image data relevant to the viewing direction determined in step 210 may be obtained in step 220.

The external image data corresponds to a region proximal to the vehicle. The external image data is obtained by the processing device from one or more image sensing means, such as the cameras, associated with the vehicle. A first camera 410, 420 may be mounted upon a front of the vehicle to view forwards there-from in a driving direction of the vehicle. The camera 410, 420 may be arranged so as to obtain external image data corresponding to a view of an occupant, such as the driver, without the bonnet 320 being present. That is, the camera may output external image data that would be perceived by the driver if the bonnet 520 was not present i.e. not obstructing the driver's view. The camera 405 may be mounted at a front of the vehicle lower than a plane of the bonnet 320, such as behind a grill of the vehicle. It will be realised that one or more cameras may be mounted in other locations, such as at a rear 440, side or underneath 430 the vehicle.

Furthermore at least some of the one or more cameras may, in some embodiments be moveably mounted. The moveably mounted camera may be arranged to rotate about an axis such that a viewing angle of the camera is vertically controllable. A vertical position of the camera may also be controlled. The moveable camera may be arranged to view in a substantially constant horizontal axis regardless of an inclination of the vehicle. For example the camera may be arranged to view generally horizontally even when the vehicle is inclined. However it will be appreciated that the camera may be arranged to be oriented non-horizontally. The camera may be arranged to have a generally constant downward orientation so as to view, and provide external image data corresponding to, a region of the vehicle which is obscured from the driver's view by the bonnet 520, door or other features of the vehicle such as seats. The region may be a region which is up to 10, 20, 50 or 100 m around the vehicle, although it will be realised that these distances are merely examples.

In step 230 a graphical representation of at least one component of the vehicle having one or more characteristics based on the information associated with the vehicle is generated. The representation may be generated by the processing device.

Figure 5:
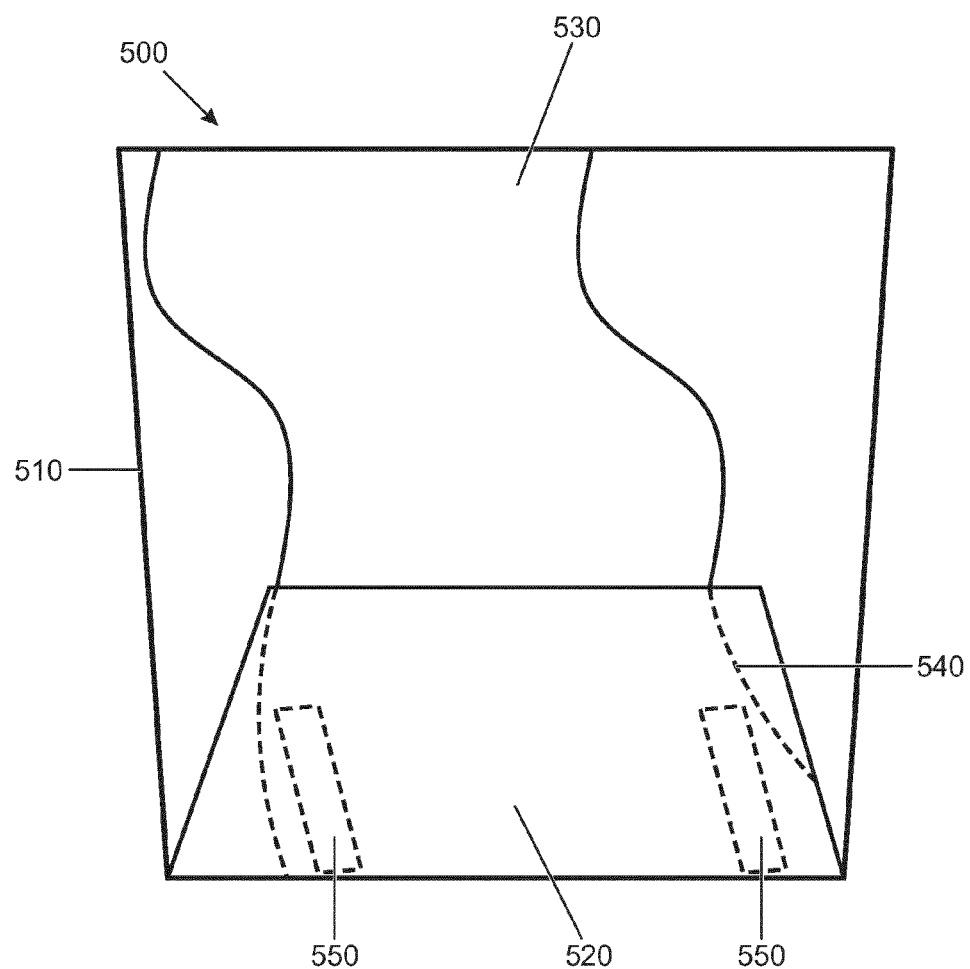
FIG. 5 shows an illustration of a view from a vehicle according to an embodiment of the invention.

The representation may be generated so as to match, or correspond to, a perspective from a point to view of the occupant of the vehicle, such as the driver, as determined in step 210. For example, the graphic representation may be a representation of the vehicle's wheels 550 as shown in FIG. 5, although the representation may be of other components of the vehicle such as a suspension system, axle of the vehicle, an engine or motor of the vehicle, or any other generally mechanical or electrical component of the vehicle. The representation may be generated so as to appear as the occupant would view the at least one component based on their current position within the vehicle and viewing direction.

In step 240 the external image data obtained in step 220 is processed based upon the viewing direction determined in step 210. The image processing in step 240 may be performed on the external image data received in step 220 to adjust a perspective of the external image data. The image processing operation may be performed by the processing device.

The external image data received from the one or more cameras 410, 420, 430, 440 associated with the vehicle is processed in step 240 to correspond to the viewing direction of the wearer of the display device 300. A perspective of external image data output by a camera associated with the vehicle may be adjusted to correspond to the viewing direction determined in step 210. External image data from a plurality of cameras 410, 420, 430, 440 may be combined in step 240 to generate external image data for display corresponding to the viewing direction. For example, if the occupant wearing the display device 300 is viewing downward toward a front region of the vehicle 400, external image data from cameras 430 at either side of the vehicle may be combined to provide external image data showing an area around the front of the vehicle, such as may be useful in off-road scenarios. Alternatively if the occupant is turned to face a rear of the vehicle, such as when reversing into a parking space, the external image data from one or more rear facing cameras is processed to correspond to the viewing direction of the occupant.

The image processing in step 240 may include a delay being introduced into the external image data. The delay time may be based upon a speed of travel of the vehicle. The delay may allow the displayed representation based on the external image data to correspond to a current location of the vehicle. For example, if the external image data is for a location around 20 m ahead of the vehicle the delay may allow the location of the vehicle to approach the location of the external image data such that, when the representation is displayed, the location corresponding to the external image data is that which is obscured from the occupant's view by the bonnet 520 or floor of the vehicle. In this way the displayed representation matches a current view of the occupant.

In step 250 a display is output by the display device 300 worn by the occupant of the vehicle 400. The display comprises one or both of the graphical representation generated in step 230 and the external image data processed in step 240. Thus the display provides at least one of a graphical representation of at least one component of the vehicle and external image data for a region proximal to the vehicle would be perceived by the occupant based on their current viewing direction. The display 300 provides an output to the occupant of information which cannot be perceived with the naked eye due to the presence of at least a part of the vehicle i.e. the display contains visual information which is otherwise obscured by the vehicle 400, such as by the bonnet or doors of the vehicle.

The display is provided so as to overlie a portion of the vehicle from the occupant's point of view. The occupant may be the driver of the vehicle. As noted above, the representation may be translucently displayed such that features underneath or behind the displayed representation, such as the bonnet 520, may still be perceived, even faintly, as will be explained.

The method 200 may be performed continually in a loop until a predetermined event occurs, such as a user interrupting the method, for example by activating a control within the vehicle. It will be realised that the predetermined event may be provided from other sources.

FIG. 5 illustrates a view 500 from a vehicle according to an embodiment of the invention. The view 500 is from an interior of the vehicle through a windscreen or windshield 510 of the vehicle viewing generally forwards, as in FIG. 1. A portion of a bonnet or hood 520 of the vehicle is visible extending forward from beneath the windscreen 510. The vehicle is present upon a roadway 530 which is visible forward of the vehicle. The viewer is wearing a display device such as the display device 300 illustrated in FIG. 3. The display device 300 is arranged to output visual information comprising a representation 550 of the front wheels of the vehicle and a representation of a region in front of the vehicle 540 obscured by the vehicle's bonnet which comprises a portion of the roadway 530 proximal to the vehicle.

As shown in FIG. 5, the information 540, 550 is displayed to overlie a portion of the vehicle's body, in this case the bonnet 520 of the vehicle. It will be realised that the information 540, 350 may be displayed to overlie other portions of the vehicle. The display means may be arranged to display the information 540, 550 to overlie an external and/or internal portion of the vehicle, depending upon the viewing direction of the occupant. The display means 300 may be arranged to translucently display the information 540, 550 thereon such that the underlying portion of the vehicle 400 may still be perceived, at least faintly, underneath the displayed information.

Figure 6:
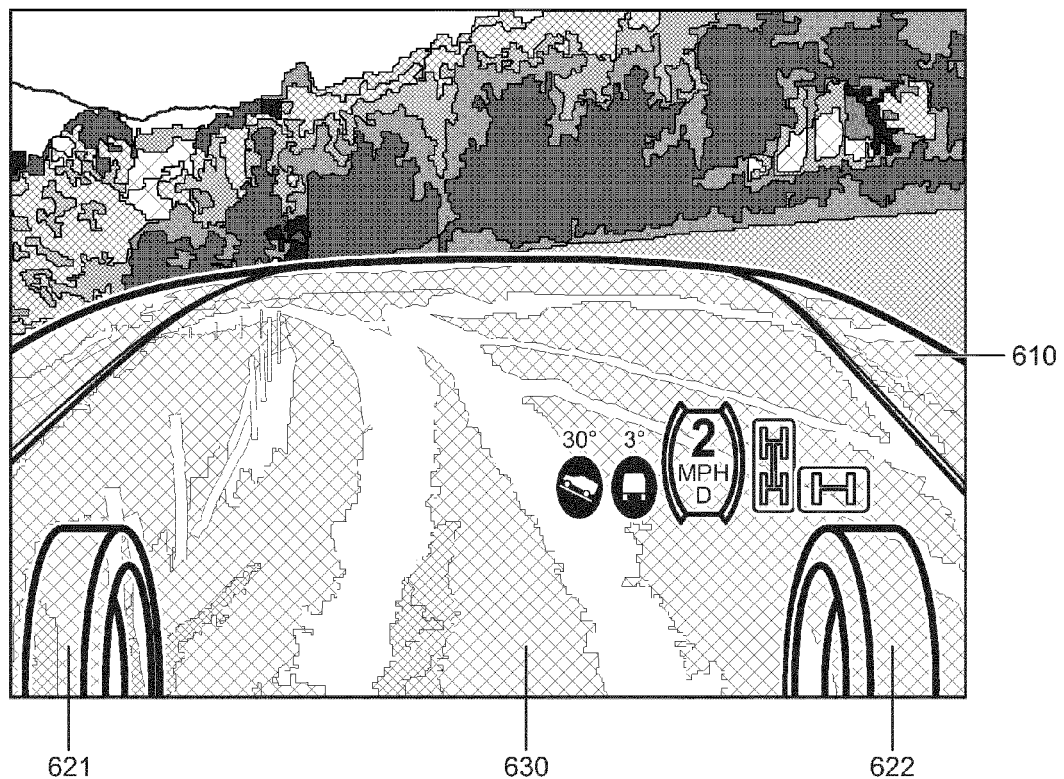
FIG. 6 is an image showing operation of an embodiment of the invention.

FIG. 6 further illustrates operation of an embodiment of the invention. FIG. 6 is a view through a windscreen of a vehicle according to an embodiment of the invention, as would be perceived by an occupant of the vehicle viewing forwards. In FIG. 6 a bonnet 610 of the vehicle is visible. Displayed so as to overlie the bonnet is a representation of first 621 and second 622 wheels of the vehicle. Also displayed is an image 630 of terrain obscured from view by the vehicle, in particular by the bonnet 610 of the vehicle. Since the vehicle is inclined backwards in FIG. 6 a roadway along which the vehicle is travelling is entirely obscured from the driver's view at a current location due to the incline and a forward extension of the bonnet 610. However the displayed representation allows the driver to appreciate a location and direction of the vehicle's wheels 621, 622 and a position and direction of the roadway on which the vehicle is travelling, which is particularly useful for off-road driving.

Figure 7:
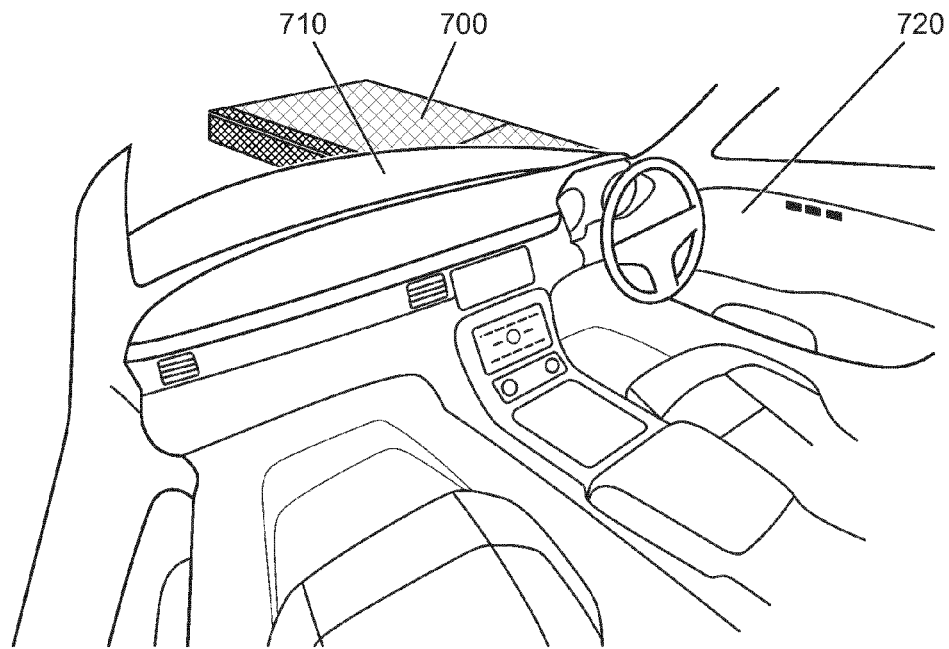
FIG. 7 is an illustration of a view from within a conventional vehicle.

Referring to FIG. 7, which shows a view from within a conventional vehicle, it can be appreciated that a view 700 external to the vehicle is obscured by both the vehicle's body i.e. external to a passenger compartment of the vehicle, in this case by the bonnet 710 and also by an interior of the vehicle i.e. an interior of a door 720 of the vehicle.

Figure 8:
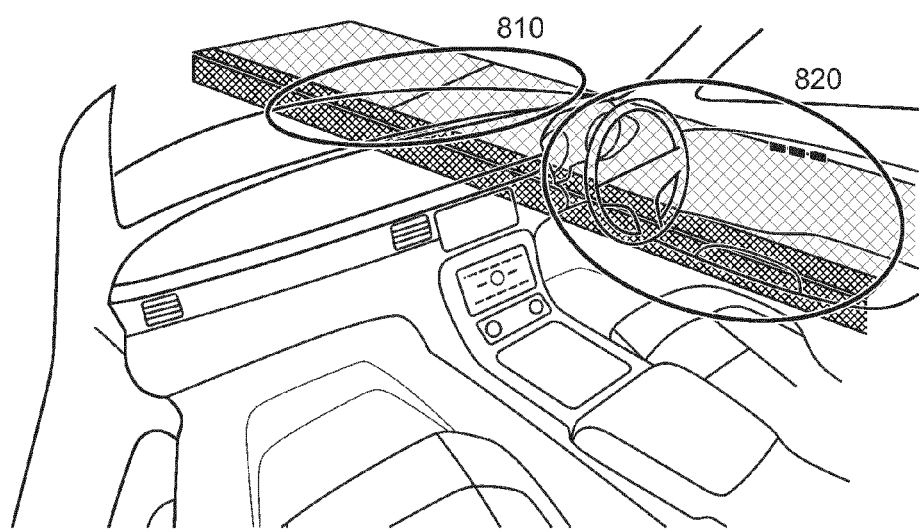
FIG. 8 is an illustration of a view from within a vehicle according to an embodiment of the invention.

Referring to FIG. 8, in order to address the above problem, when the occupant is viewing toward a side of the vehicle, the display device 300 is arranged to output an image 810, 820 comprising visual information arranged to overlie portions of the vehicle. The portion of the vehicle, as shown in FIG. 8, may comprise a dashboard, door interior or other interior surfaces of the vehicle. As can be appreciated from FIG. 8 the visual output of the display device 300 provides a greater view of objects external to the vehicle which would otherwise be obscured or not visible. It will also be appreciated that when the occupant is viewing downwards and/or to a rear of the vehicle appropriate visual information is output by the display device 300.

Figure 9:
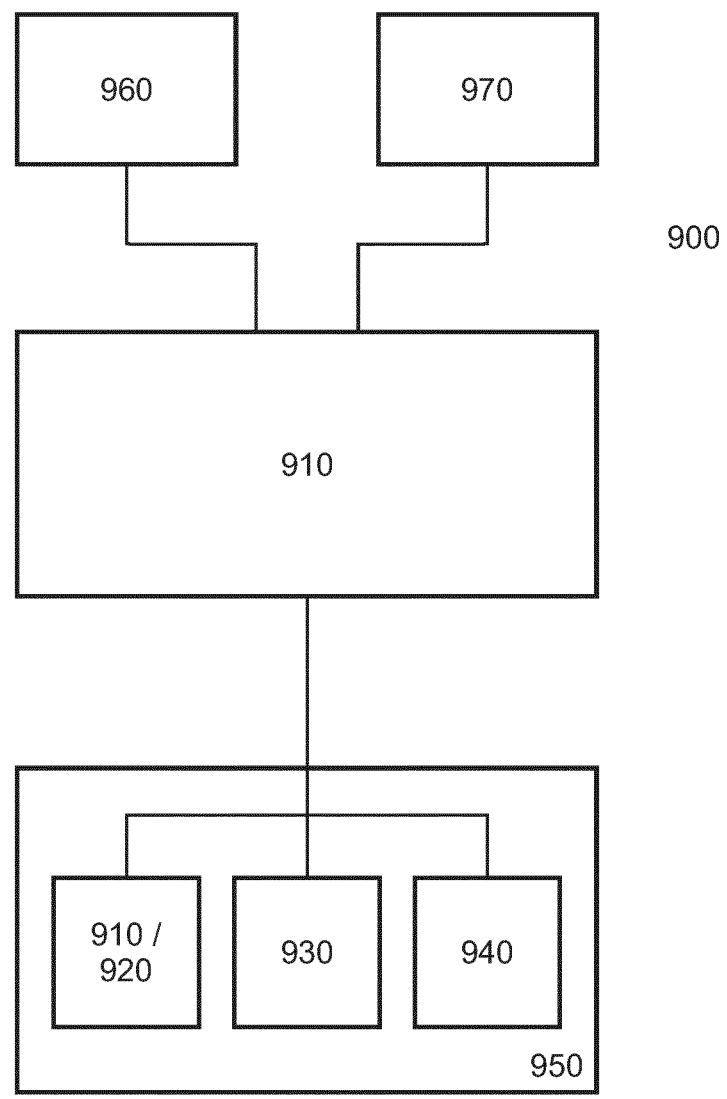
FIG. 9 illustrates a system according to an embodiment of the invention.

FIG. 9 illustrates a system 900 according to an embodiment of the invention. The system 900 is a display system for use with a vehicle. The system 900 is arranged to display one or both of a graphical representation of at least one component of the vehicle having one or more characteristics based on information associated with the vehicle 400, or a representation of external image data associated with the vehicle 400, wherein the one or more displayed representation is arranged to overlie a portion of the vehicle via a display means 950 worn by an occupant of the vehicle.

The system 900 comprises a display means 950 worn by an occupant, as previously described with reference to FIG. 3. The display means 950 comprises at least one combiner although in the embodiment shown in FIG. 9 the display means 950 comprises a first optical combiner 910 and a second optical combiner 920 each arranged to display an image in front of the wearer's right and left eyes, respectively.

The display means 950 further comprises at least one camera 930. The camera 930 is arranged to output occupant image data from which a direction of view of the wearer can be determined. Further, the display means 950 comprises one or more sensors 940 from an output of which the viewing direction of the wearer may be determined. The camera 930 and sensor(s) 940 may be as previously described with reference to FIG. 3.

External image data for display by the display means 950 is provided from a control unit 910 and occupant image data output by the camera 930 and sensor data output by the one or more sensors 940 is received by the control unit 910. Similarly the control unit 910 is arranged to receive external image data for associated with the vehicle, such as from one or more cameras 960 mounted upon the vehicle. The one or more cameras 960 may be arranged to view at least a portion of a region around the vehicle which is obscured from the occupant's view by the vehicle. The cameras 960 may include one or more cameras 960 facing ahead, behind or at sides of the vehicle. One or more cameras 960 may be arranged to view in a generally downward direction, such as to observe a location of one or more wheels of the vehicle.

The system 900 may further comprise means 970 for receiving information associated with the vehicle, such as data indicative of a state of one or more components of the vehicle. The components may include one or more of suspension, gearbox, and wheels etc., as previously described. The means may comprise an interface with a management system of the vehicle. The received information allows a graphical representation of at least one component of the vehicle having one or more characteristics based on the information associated with the vehicle to be displayed.

The control unit 910 is arranged to receive information such as image and/or sensor data from the display device 950, and external image data and/or information associated with components of the vehicle and to generate external image data for display on the display device according to a viewing direction of the user, as will be explained. The control unit 950 may perform a method as shown in FIG. 2.

It will be appreciated that embodiments associated with a wearable display device may be particularly suitable to off-road use, allowing the occupant to flexibly view external image data corresponding to regions around the vehicle.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A display method for use in a vehicle, the method comprising:
    obtaining external image data of a region proximal to the vehicle and information associated with the vehicle in relation to at least one component thereof, the external image data being obtained from one or more cameras associated with the vehicle and the information including data indicative of a state of the at least one component; and
    displaying, on a display device worn by an occupant of the vehicle, a graphical representation of the at least one component based on the obtained information associated with the at least one component, and a graphical representation of an image derived from the external image data,
    wherein each displayed graphical representation is configured to overlie, from a point of view of the occupant, a portion of the vehicle such that the portion of the vehicle appears at least partly transparent.

2. The method of claim 1, further comprising determining a viewing direction of the occupant of the vehicle, wherein the graphical representation of the at least one component of the vehicle or the graphical representation of the image derived from the external image data is generated based on the viewing direction.

3. The method of claim 2, further comprising receiving occupant image data from an imaging device associated with the display device, wherein the occupant image data comprises image data from the point of view of the occupant and generally corresponds to the viewing direction of the occupant.

4. The method of claim 3, further comprising determining the viewing direction of the occupant of the vehicle based on a registration feature present in the occupant image data, wherein the registration feature comprises one or more features of the vehicle having a known geometry.

5. The method of claim 2, further comprising receiving sensor data from one or more sensors associated with the display device, and determining the viewing direction based thereon.

6. The method of claim 1, wherein each graphical representation is translucently displayed.

7. The method of claim 1, wherein each graphical representation is configured to overlie an external portion of the vehicle, optionally wherein the external portion is a bonnet of the vehicle.

8. The method of claim 1, wherein the graphical representation is configured to overlie an interior portion of the vehicle, optionally wherein the interior portion of the vehicle comprises one or more of a dashboard of the vehicle, a door of the vehicle, a floor of the vehicle, and interior features of the vehicle.

9. The method of claim 1, wherein the at least one component of the vehicle is a mechanical component of the vehicle, optionally wherein the mechanical component is one of: a steering system of the vehicle, one or more wheels of the vehicle, a suspension of the vehicle, and an engine of the vehicle.

10. The method of claim 1, wherein the one or more cameras are configured to view at least a portion of a region around the vehicle, and/or wherein the one or more cameras are configured to view in a generally downward direction.

11. The method of claim 1, further comprising processing the external image data such that the graphical representation of the image derived from the external image data corresponds to a viewing direction of the occupant.

12. The method of claim 1, further comprising processing the external image data to introduce a delay into at least a portion of the external image data, optionally determining the delay based on information associated with the vehicle, optionally wherein the information is indicative of a speed of the vehicle.

13. A display apparatus for use with a vehicle, the display apparatus comprising:
    a wearable display configured to display information to an occupant of the vehicle such that the displayed information overlies, from a point of view of the occupant, a portion of the vehicle such that the portion of the vehicle appears at least partly transparent; and
    a processor configured to determine information associated with the vehicle, the information including data indicative of a state of one or more components of the vehicle, and receive external image data for a region ahead of the vehicle, the external image data being obtained from one or more cameras associated with the vehicle; and
    wherein the processor is configured to cause the display to display a graphical representation of at least one component of the vehicle based on the determined information associated with the vehicle and a graphical representation of an image derived from the external image data.

14. The apparatus of claim 13, wherein the display is configured to translucently display information thereon, optionally wherein the display is configured to translucently display the representation so the portion of the vehicle is partly visible.

15. The apparatus of claim 13, wherein the display comprises an imaging device configured to output external image data corresponding to a viewing direction of the occupant, optionally wherein the processor is configured to determine the viewing direction of the occupant, optionally wherein the processor is configured to determine the viewing direction based on a registration feature.

16. The apparatus of claim 13, wherein the at least one component of the vehicle comprises a steering system of the vehicle, one or more wheels of the vehicle, a suspension of the vehicle or an engine of the vehicle.

17. The apparatus of claim 13, further comprising one or more cameras configured to output the external image data, optionally wherein the one or more cameras are configured to view at least a portion of a region around the vehicle and/or wherein at least one of the one or more cameras are configured to view in a downward direction.

18. The apparatus of claim 13, wherein the processor is configured to receive occupant image data of the occupant and to determine a viewing direction of the occupant based thereon.

19. The apparatus of claim 13, wherein the processor is configured to process the external image data to introduce a delay into the graphical representation of the image derived from the external image data.

20. A vehicle comprising the apparatus of claim 13.

* * * * *